United States Patent
Jacob et al.

(10) Patent No.: US 6,261,463 B1
(45) Date of Patent: Jul. 17, 2001

(54) WATER BASED OIL DISPERSANT

(75) Inventors: Savarimuthu M. Jacob, Edison, NJ (US); Robert E. Bergman, Jr., Pearl River, NY (US)

(73) Assignee: U.S. Polychemical Marine Corp., Chestnut Ridge, NY (US)

( * ) Notice: Subject to any disclaimer, the term of this patent is extended or adjusted under 35 U.S.C. 154(b) by 0 days.

(21) Appl. No.: 09/262,100

(22) Filed: Mar. 4, 1999

(51) Int. Cl.$^7$ .............. E02B 15/00; C09K 3/32; B01F 17/22; B01F 17/34
(52) U.S. Cl. .............. 210/749; 210/925; 516/58; 516/65; 516/69; 510/365
(58) Field of Search .................. 516/58, 65, 69; 210/749, 693, 925; 510/365, 506

(56) References Cited

U.S. PATENT DOCUMENTS

| | | | | |
|---|---|---|---|---|
| 3,900,421 | * | 8/1975 | Fusey | 516/56 |
| 3,998,733 | * | 12/1976 | Blanchard et al. | 516/58 |
| 4,469,603 | * | 9/1984 | Lepain et al. | 210/749 |
| 4,764,285 | * | 8/1988 | Robbins et al. | 210/749 |
| 4,978,459 | * | 12/1990 | Bock et al. | 210/749 |
| 5,385,675 | * | 1/1995 | Vroman et al. | 210/925 |
| 5,618,468 | * | 4/1997 | Canevari et al. | 210/693 |
| 5,728,320 | * | 3/1998 | Fiocco et al. | 516/58 |

OTHER PUBLICATIONS

Rosen, Surfactants And Interfacial Phenomena, (John Wiley & Sons, NY, NY, copyright 1978) pp. 242–245, May 1983.*

* cited by examiner

Primary Examiner—Daniel S. Metzmaier
(74) Attorney, Agent, or Firm—Notaro & Michalos P.C.

(57) ABSTRACT

An effective and non-toxic oil spill dispersant combines a predominately oil-soluble surfactant (eg., polyethylene glycol mono-oleate) with a predominately water-soluble surfactant (eg., cocoamide) and a co-solvent for coupling a mixture of the predominately oil-soluble surfactant and the oil spill, with the predominately water-soluble surfactant. Water is included in the combination to help advance the interaction between the predominately oil-soluble surfactant and the predominately water-soluble surfactant as well as the co-solvent. The water component also helps reduce the viscosity of the dispersant to allow it to be pumped under pressure.

15 Claims, 1 Drawing Sheet

WATER BASED OIL DISPERSANT

FIELD AND BACKGROUND OF THE INVENTION

The present invention relates in general to dispersing agents for dispersing oil and other petrochemicals from the surface of bodies of water, and in particular to a new and useful dispersant which is water-based and avoids the use of petroleum distillates, the major solvent in all currently US EPA approved oil spill dispersants.

There are two basic mechanisms for dealing with an oil spill on a body of water, such as crude oil from a tanker at sea. One is to try and recover the oil and the other is to disperse the oil. Recovery has proven to be extremely ineffective in that only a small portion of the oil is actually recovered, allowing the rest to reek havoc on nearby shorelines and wild life.

Currently, the United States Environmental Protection Agency (EPA) permits the use of only four commercially available dispersants to disperse oil spills. Two of them are known by the trade name COREXIT and are available from Nalco/Exxon Energy Chemicals, LP. of Sugar Land, Tex. COREXIT 9597 and the more recent COREXIT 9500 compositions both contain a large percentage of petroleum distillates. The other two permitted dispersants are known by the trademarks NEOS AB 3000 for a hydrocarbon solvent based dispersant available from NEOS Company Limited of Kobe, Japan, and MARE CLEAN 200, also based on hydrocarbon solvents and available from Taiho Industries Co., Ltd. of Tokyo, Japan.

The use of mineral spirits and other hydrocarbon based dispersants is counterproductive in that it adds to the loading of the ocean with compounds of the same petrochemical class as the spill itself.

The dispersing effect of a dispersant must also be balanced against its toxicity to fish and other wild life.

U.S. Patent 5,399,350 to Potter, assigned to Nurture, Inc., discloses a proteinaceous oil spill dispersant. Reference is made in this patent to two water-based dispersants, one identified by the trademark ATLANT'OL AT-7, available from Aspra, Inc. and the other known by the trademark OMNI-CLEAN OSD, available from Delta Omega Technologies. Delta Omega Technologies is also the assignee of U.S. Pat. No. 5,308,550 for a cleaning and wetting agent and solvent.

U.S. government regulations that dictate the characteristics of an acceptable dispersant with regard to effectiveness and toxicity, are found in 40 CFR § 300.900 and following sections. Comparative tests following the protocol of these regulations are appear later in this disclosure in a section entitled TESTING OF DISPERSANT EFFICIENCY.

SUMMARY OF THE INVENTION

An object of the present invention is to provide a surfactant-based and water-based dispersant which includes a unique combination of both predominately oil-soluble and predominately water-soluble surfactants with a co-solvent and, in preferred embodiments, a significant proportion of water.

The dispersant of the invention has been found to be extremely effective in dispersing oils, including South Louisiana Crude (SLC) and Prudhoe Bay Crude (PBC) as proven by laboratory tests that follow the protocols of 40 CFR § 300. The dispersant of the invention also has low toxicity as proven by clinical toxicity tests conducted according to the protocols of 40 CFR § 300. Both tests demonstrate superior performance of the invention over the four EPA approved dispersants mentioned above.

A further object of the present invention is to provide a dispersant which contains from about zero to about 50 percent by weight water, from about 35 to about 85 percent by weight predominately oil-soluble surfactant, about 8 to about 32 percent by weight predominately water-soluble surfactant, and about 4 to about 16 percent by weight co-solvent.

For the purpose of this disclosure, the term predominately oil-soluble surfactant is used to mean a surfactant selected to have at least some water-soluble characteristics and, in the case of a non-ionic surfactant, to have an HLB or Hydrophilic and Lipophilic Balance, which averages about 10 to about 18. The predominately oil-soluble surfactant of the preferred embodiment of the invention is made up of one or more surfactants, and preferably three different non-ionic surfactants that each contribute their own unique combination of oil solubility and water solubility to the dispersant, to initially combine with the oil and form an emulsifiable combination.

The term predominately water-soluble surfactant is used to mean a combination of one or more surfactants which are preferably anionic and which solubilize the combination of oil-soluble surfactant and oil, into the body of water suffering from the oil spill.

The term petrochemical spill or oil spill is used here broadly to include any petrochemical spill; e.g. a spill of crude oil, processed oil, fuel oil, gasoline and other hydrocarbon containing products and materials.

The co-solvent of the invention acts as a coupling agent to help further draw the oil-plus-surfactant mixture into emulsion with the water. The term is meant to include the examples given in this disclosure and any other chemical which has a coupling effect as explained here.

The water component of the composition, where present, helps advance the interaction between the predominately oil-soluble surfactant and the predominately water-soluble surfactant as well as the co-solvent. In addition, water helps reduce the viscosity of the dispersant composition of the invention to allow the composition to be pumped under pressure. This is important in that dispersants for use in dispersing an oil spill are generally applied by high pressure pumping, often from helicopters or cargo planes flying over the affected area. The preferred embodiment of the dispersant of the present invention has a viscosity of about 140 cP (centipoise) with a preferred range for viscosity being about 75 to about 200 cP.

Another object of the invention is to provide a method for dispersing a petrochemical spill on a body of water, comprising providing the dispersant of the invention and supplying an effective amount of the dispersant onto the body of water at the spill, for dispersing the spill by emulsifying at least some of the petrochemical into the body of water. This included spraying or pumping the dispersant into or onto the water near the spill, or into or onto the spill itself. Advantageously the dispersant is supplying to the petrochemical spill in an amount of about one part dispersant to about 5 to 100 parts petrochemical, and preferably in a ratio of about 1:10 (dispersant to petrochemical).

A still further object of the invention is to provide a petrochemical spill dispersant and method which is superior to existing, approved dispersants, in both effectiveness and non-toxicity.

Yet another object of the invention is to provide a petrochemical spill dispersant and method of using the same, the dispersant being water-based and being especially formulated from various select surfactant types and combinations so as to orchestrate a complex and effective interaction that includes interfacial surface tension reduction, coupling and emulsification of the dispersant ingredients among themselves and with the petrochemical and water from the body of water.

The various features of novelty which characterize the invention are pointed out with particularity in the claims annexed to and forming a part of this disclosure.

BRIEF DESCRIPTION OF THE DRAWING

The only FIGURE in the drawing is a schematic illustration of an oil droplet being emulsified according to the present invention.

DESCRIPTION OF THE PREFERRED EMBODIMENTS

Figure 1:
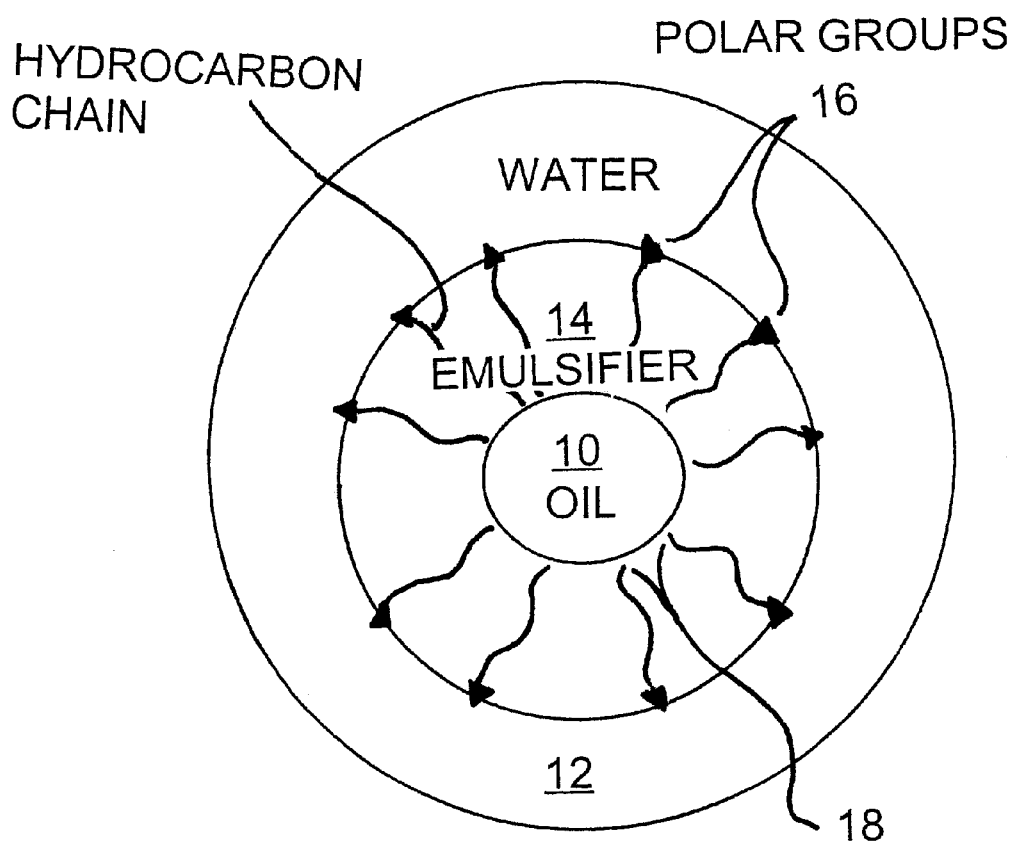

Theory and Mechanism:

The effectiveness of a dispersant depends on the type of surfactant or surfactant combination used in the system.

If non-ionic surfactants are used, the Hydrophilic and Lipophilic Balance or HLB value of the combined system is a vital factor in producing a stable emulsion. The HLB is applicable mostly to non-ionic surfactants that are poly ethoxylated.

These HLB values range from zero (completely lipophilic or oil-loving) to 20 (completely hydrophilic or water-loving) and are calculated by dividing the weight percent of ethylene in the surfactant by 5.

An HLB range at about 3.5–10.5 forms a good water/oil emulsifier; at 10–15 has good wetting; at 10.5–18 is a good oil/water emulsifier and at 12–15 forms good detergents.

A non-ionic surfactant with a HLB value of 3.6 or 5.8 is added to an oil, then the surfactant will dissolve in the oil phase so that a clear solution is obtained. If a small quantity of water is added to this combination of oil-surfactant (oil phase is the larger medium or continuous phase or dispersion medium, while water is the smaller medium or discontinuous phase or dispersed phase), the water will be emulsified in the oil to give an unstable emulsion or a milky solution or a clear solution depending directly on the richness of the surfactant and inversely on the richness of water added. This type of system is called as water in oil emulsion or w/o emulsion. The surfactant which does the emulsification or dissolution may be called as an oil-soluble emulsifier.

Emulsifiers:

With reference to the FIGURE, when two immiscible liquids, such as crude oil 10 and water 12 are shaken together vigorously, a milky looking solution results. This is an emulsion consisting of small globules of oil 10 suspended in water 12. The globules remain suspended in water for only a short period of time, however.

On standing, the two liquids soon separate, the oil globules rising to the top and forming a separate oil phase. In other words the emulsion formed by merely shaking the two immiscible liquids together is highly unstable. In order to form stable emulsions of fairly high concentrations, it is necessary to add another substance, known as an emulsifier or emulsifying agent 14, in certain quantity.

The emulsifying agents are generally long chain compounds with polar groups such as sulfonates, carboxylate, sulphate, or phosphate. Their function is to lower the interfacial surface tension between the water and oil so as to facilitate mixing of the two liquids. The emulsifying agents are concentrated at the interface 14 between the water and oil in such a way that their polar end 16 (i.e. the hydrophilic end such as a —COONa group) dips into the water 12 and the hydrocarbon chain or lipophilic end 18, dips in the oil, as shown in the FIGURE. This helps bring the two liquid phases into more intimate contact with each other.

Selecting Surfactants:

The surfactants of the invention are so chosen to obtain a HLB value of about 10–18, or preferably about 10.5–18. This may be achieved by selecting the surfactants in the oil-soluble range and in the 10-18 range, along with other coupling or oil and water soluble solvents. In making this selection, the following factors should be considered:

1. Surfactants such as amine oxides, amides etc. are oil emulsifying type agents.

2. The anionic surfactants such as sodium petroleum sulfonates (the fifth ingredient of composition E2 in the following tables), phosphate esters, etc., stabilize the emulsion formed.

3. Secondary alcohol, poly ethoxylated type surfactants tend to solubilize in both oil and water, thereby increasing the solubility and stability of the emulsion.

4. Non-ionic surfactants are chosen to have an HLB value near 10.

5. Co-solvents or coupling agents which are mutually soluble in water and in oil give a stable emulsion.

6. Amphoteric type surfactants, such as betaines are very mild to the skin and give stable emulsion.

7. Sugar derivatives such as polymeric glucosides Glucopan 425 N, make stable emulsions.

8. Oil-splittable surfactants such as Tergitol SP 135, gave unstable emulsions which are good for splitting the oil from the water or system.

9. It was found that the first ingredient in the preferred embodiments of the invention (compositions 7F, E1 and E2 in the following tables), that is Ethox TO9A (poly ethylene glycol mono-oleate, HLB=11.7, a predominantly oil-soluble surfactant) dissolves in the crude oil. The hydrocarbon chain of the TO9A attaches to the oil and the carboxylate or polar group projected toward the water.

10. The second ingredient of composition E2, Ethox TAM-5 (polyoxyethylene tallow amine, HLB=8.8, another predominantly oil-soluble surfactant) also performs the same function as the first ingredient, but is more oil-soluble by virtue of its lower HLB value.

11. The third ingredient of composition E2, Ninol 4OCO (cocoamide, No HLB value, a predominantly water-soluble surfactant) solubilizes both oil and water in each other. 12. The fourth ingredient in composition E2, Tergitol 15-S-5 (polyethoxylated, linear secondary alcohol, HLB=10.6, also a predominantly oil-soluble surfactant) is readily soluble in oil similar to the first ingredient, but its solubility is more in oil comparable to the second ingredient, yet mutually soluble in both oil and water.

13. Therefore, the first, second and fourth ingredients essentially tend to dissolve in the oil and have dispersability in water by virtue of their HLB values of 11.7, 8.8 and 10.6 respectively. This sets the background for the dispersion/solubility or the oil-plus-predominantly oil-soluble surfactant mixture in water. This combination as explained above when shaken with water will form an emulsion but an unstable one. The mixture will split and separate into two phases unless the further teaching of the present invention is followed.

14. To obtain a stable emulsion the system in consideration 13 above, must be stabilized by other surfactants with either higher HLB values or which are of the anionic type, that is the predominantly water-soluble surfactants of the invention. Their function is similar to the oil-soluble surfactants (considerations 9, 10 and 12) except the predominantly water-soluble surfactants solubilize/disperse the mixture of oil-plus-predominantly water-soluble surfactants in water so that the dispersed oil will not separate quickly. In other words they help produce very fine droplets of the mixture and keep it dispersed or solubilized in water as the case may be.

15. The sixth ingredient, Di propylene glycol mono methyl ether or DPM, functions as a co-solvent or coupling agent to enhance solubility of surfactants in water and oil whereby increase the solubility or dispersibility of the oil in water. DPM also dissolves in oil and in water, thereby enhancing the mutual solubility of the oil and water to some degree.

16. The seventh ingredient, water, is the medium in which the surfactants, emulsifiers and the co-solvents are dissolved. Without water, the dispersant of the invention still functions well, but is slightly more viscous. Water is added to reduce viscosity to about 75 to 200 cP. Even if no water is used, no petroleum solvents are present in the dispersant of the invention. Petroleum solvents pose environmental hazards. Since no petroleum solvent is present such an hazard is completely eliminated by the invention.

17. It was also found that the ratio of TO9A to other surfactants in the preferred formulas was in the range of about 10:1 to 2:1. The major constituent of the preferred embodiment is the TO9A ingredient to give solubility in the oil and the minor constituents (other surfactant and the co-solvent) help stabilize the emulsion formed. The formula of the dispersant was focused with TO9A as a major surfactant. The ratio of TO9A to other surfactants could vary from 5:1 to 1:5, however, the best ratio was in the range of 3:1 to 2:1. The 1 part of the other surfactants could be either everything adding up to 1 or individually equal to 1. TO9A was chosen for the fact that the HLB value is ideal for better emulsification. TO9A is derived from naturally occurring animal or plant sources. Cost factor is also another determining factor. Naturally occurring raw material coupled with lower cost and the performance is a major factor in selecting TO9A as a primary surfactant or emulsifier.

18. The fifth ingredient in compositions 7F, El and E2 (sodium petroleum sulfonate) is an anionic surfactant emulsifier. It tends to disperse the oils which had dissolved emulsifier in them. A stable emulsion is produced. This effect is aided by the solvent, water, and Ninol 40CO.

19. The effectiveness of the dispersant is based on (1) the ability to dissolve in the oil or petrochemical of the spill; (2) the ability to further dissolve the pre-dissolved oil and surfactant mixture into water; and (3) the ability to ease the dissolution or dispersion of the oil-surfactant-water mixture by the aid of the mutually soluble non-petroleum based co-solvent. The synergy of these three actions produce a tighter more stable emulsion; that is to say a complete, stable emulsion is formed with the dispersant of the invention.

20. Water is the medium of the dispersant in its preferred form but is not essential. If present the content of water in the dispersant can vary from about 10–50% and yet produce a stable emulsion. The perfect combination in the required ratios is the key to a stable emulsion formation achieved by the invention.

Summarizing the considerations in selected the ingredients and proportions for the dispersant of the present invention:

The first surfactant ingredient is the major emulsifying agent. The ratio can vary from about 5:1 to 1:5. In terms of HLB value, an optimum value of 10–18 gave a stable emulsion. The second and fourth ingredients work in conjunction with the first for better oil solubilization leading to stable emulsification. The third and fifth ingredients solubilize the mixture of oil-plus ingredients 1, 2 and 4. Ingredient six is a coupling agent which is mutually soluble in oil, water and the surfactants. It is free of petroleum distillates and petroleum solvents. The seventh, water, is the medium for the dispersant. This serves as a base and does not pose any health or environmental hazard.

Testing Dispersant Efficiency:

The efficiency of the dispersant of the invention to emulsify crude oils; specifically Prudhoe Bay Crude (PBC) and South Louisiana Crude (SLC), according to the protocol 40 CFR Part 300.900 was tested. Comparative tests were also conducted to demonstrate the criticality of the present invention, and its superior performance over currently approved dispersants.

Following is the protocol for 40 CFR 300.900 testing:

A dispersant must attain an effectiveness value of 45% or greater to be added to the National Oil And Hazardous Substances Pollution Contingency Plan (NPC) Product Schedule, a.k.a. National Contingency Plan.

Prepare a premixed dispersant-oil by mixing 1 part dispersant 10 parts oil (v:v). Store this in glass containers. Add 120±2 ml synthetic sea water to 3 each of modified 125 ml glass Erlenmeyer flasks. Measure and record the water temperature. Place the flasks securely into an attached slot on a shaker table. Carefully add 100 ml of an oil-dispersant solution onto the center of the water's surface using a positive displacement pipette. Agitate the flasks for 20±1 minutes at 150±10 rpm on the shaker table. After 20±1 minutes shaking, remove the flasks from the shaker table and allow them to remain stationary for 10±1 minutes for oil droplet "settling." At the conclusion of the 10 minute settling period, carefully decant a 30 ml sample through the side spout of the test flasks into a 50 ml graduated cylinder. Perform DCM extract and analyze using UV-spectrometer at 340, 370 and 400nm wavelength and determine the quantity of oil.

Performance Criterion:

The dispersants tested remain in consideration for addition to the NCP Product Schedule if the average dispersant effectiveness, as calculated, is at least 45% (i.e., 50%±5%).

TABLE I

| TEST SAMPLE | CRUDE OIL TYPE | % EFFECTIVENESS OF DISPERSANT | | | | | | % AVERAGE |
|---|---|---|---|---|---|---|---|---|
| | | rp. 1 | rp. 2 | rp. 3 | rp. 4 | rp. 5 | rp. 6 | |
| COREXIT 9500A | PBC | 41.9 | 43.6 | 46.6 | 46.3 | 50.3 | 51.6 | 46.7 |
| COREXIT 9500A | SLC | 1.6 | 2.1 | 5.6 | 15.5 | 20.2 | 17.2 | 10.3 |
| 7F:C | PBC | 24.1 | 27.6 | 31.3 | 26.8 | 27.3 | 25.2 | 27.1 |

TABLE I-continued

| TEST SAMPLE | CRUDE OIL TYPE | % EFFECTIVENESS OF DISPERSANT | | | | | | % AVERAGE |
|---|---|---|---|---|---|---|---|---|
| | | rp. 1 | rp. 2 | rp. 3 | rp. 4 | rp. 5 | rp. 6 | |
| 7F:C | SLC | 111.3 | 114.7 | 115.9 | 98.5 | 104.3 | 113.6 | 109.7 |
| E1 | PBC | 26.3 | 28.2 | 32.6 | 36.3 | 45.8 | 37.4 | 34.4 |
| E1 | SLC | 97.2 | 110.7 | 116.4 | 97.7 | 98.3 | 113.6 | 105.6 |
| E2 | PBC | 21.7 | 23.2 | 22.9 | 22.2 | 30.7 | 27.5 | 24.7 |
| E2 | SLC | 72.6 | 85.3 | 89.5 | 88.2 | 97.5 | 92.8 | 87.6 |

The overall effectiveness of each dispersant is given below, based on the:

TABLE II

| Phase | Dispersant | % Effectiveness |
|---|---|---|
| I | COREXIT 9500A | 33.5 |
| I | Sample B | 16.1 |
| II | COREXIT 9500A | 28.5 |
| II | Sample C:7F | 68.4 |
| II | Sample E1: 85% 7F | 70.0 |
| II | Sample E2: 80% 7F | 56.2 |

Samples C, E1 and E2 exhibited average effectiveness more than the specified 50±5%. Any one of the samples could be chosen to be a candidate for dispersing oil spill. The samples submitted are Concentrate formula 7F, 80% of 7F and 85% of 7F. The 80%7F and 20% water formulation is identified as Polychem Dispersit SPC 1000. A sample of the same was sent for toxicological evaluation and passed the non-toxicity requirements of 40 CFR 300.

Screening Surfactant/Dispersing Prudhoe Bay Crude:

The first set of formulations for dispersing Prudhoe Bay Crude and South Louisiana Crude did not pass the overall effectiveness tests.

The formulation was based on the following information:

1. Composition and properties of COREXIT 9500: oxy-alkylate polymers, organic sulfonic acid salt, substituted fatty esters, glycol ether and aliphatic hydrocarbon (CAS 64742-47-2, ~20–40%) sp. gr. 0.95, visco. 177 cst, 32° F., B.Pt. 296° F., Flash pt. 210° F., vap. pr. 15.5 mm Hg at 100° F., solids: 53%, solvents: 47%.

2. Properties of emulsifying type surfactants and general formulation to emulsify petroleum solvents and water.

TABLE III

| System | 1 | 2 | 3 | 4 | 5 | 6 | 7 | 8 | 9 | 10 | 11 | 12 | 13 |
|---|---|---|---|---|---|---|---|---|---|---|---|---|---|
| H$_2$O | 45 | 45 | 48 | 23 | 20 | 34 | 40 | 22 | 25 | 26 | 22 | 17 | 33 |
| Biosoft | 5 | 8 | 8 | 4 | 4 | 5 | 5 | 5 | 5 | 5 | 5 | 5 | 5 |
| TEA | 6 | 55 | 5 | 2 | 5 | — | — | 8 | 5 | 3 | 10 | 20 | 8 |
| DPM | 5 | 7 | 15 | 25 | 20 | 10 | 10 | 15 | 10 | 10 | 10 | 20 | 10 |
| Acintol | 5 | — | — | — | 5 | 10 | 10 | 10 | 5 | — | 10 | 5 | 10 |
| TO9A | 5 | 2 | — | 5 | 5 | 5 | 3 | 5 | 5 | 5 | 5 | 5 | 5 |
| 4OCO | 5 | 5 | — | 8 | 2 | 5 | 3 | 5 | 5 | 5 | — | 5 | 2 |
| Amp.CG | 6 | 6 | — | — | — | 5 | 5 | — | — | — | 5 | — | — |
| Tam5 | 10 | 10 | 5 | 8 | 8 | 5 | 5 | 3 | 5 | 5 | 8 | 8 | 2 |
| TMN 3 | 3 | — | — | — | — | — | — | — | — | — | — | — | — |
| Mac.19 | 5 | 3 | — | — | — | — | — | — | — | — | — | — | — |
| CEM 38 | — | 3 | — | — | — | — | — | — | 3 | — | — | — | — |
| NA.P.S. | — | — | 5 | 5 | 5 | 2 | — | 5 | 5 | 5 | 10 | 6 | 5 |
| NIN.411 | — | — | 5 | 10 | 5 | 2 | — | 5 | 5 | 5 | 5 | 9 | — |
| NP110 | — | — | 5 | 10 | 9 | 2 | — | 3 | 5 | 5 | 5 | 9 | — |

TABLE III-continued

| System | 1 | 2 | 3 | 4 | 5 | 6 | 7 | 8 | 9 | 10 | 11 | 12 | 13 |
|---|---|---|---|---|---|---|---|---|---|---|---|---|---|
| 2449 | — | — | — | — | 5 | 5 | 5 | — | — | — | 5 | 5 | — |
| KOH | — | — | — | — | — | 8 | 8 | — | — | — | 8 | — | — |
| ALX 100 | — | — | — | — | — | 2 | — | — | — | — | — | — | — |
| 15-S-3 | — | 3 | — | — | — | 5 | 3 | 8 | 5 | 5 | 2 | 0.5 | — |
| SP 190 | — | — | — | — | — | — | 3 | 5 | 5 | 5 | — | — | — |
| SP135 | — | — | — | — | — | — | 6 | 8 | 5 | 5 | — | — | 5 |
| SP160 | — | — | — | — | — | — | 3 | 5 | 5 | 5 | — | — | — |
| Sp145 | — | — | — | — | — | — | — | — | — | — | — | — | 5 |
| RW100 | — | — | — | — | — | — | — | — | — | — | 2 | 0.5 | — |
| XJ | — | — | — | — | — | — | — | — | — | — | — | — | 10 |

The submitted sample (#12) has the following composition:

| Water | 17.0 |
|---|---|
| Dodecyl benzene sulfonic acid (DDBSA) | 5.0 |
| Triethanol amine | 5.0 |
| Dipropylene glycol methyl ether | 20.0 |
| Tall oil fatty acid, ethoxylated (Ethox TO9A) | 5.0 |
| Coco (nut oil) amide (Ninol 4OCO) | 5.0 |
| Ethoxylated tallow amine (Ethox TAM5) | 8.0 |
| Sod. Petroleum sulfonate (Petronate HL) | 6.0 |
| Amine Oxide surfactant (Ninate 411) | 9.0 |
| Phosphated ester, aromatic (Ethox NP110) | 9.0 |
| Tall oil (acintol FA1) | 5.0 |
| Coco amide (Ethox 2449) | 5.0 |
| Ethoxylated 2ndary alcohol (Tergitol 15-S-3) | 0.5 |
| Amine oxide (Triton RW 100) | 0.5 |

Various combinations thereof were made and evaluated to visually see the emulsification. Sample #12 was chosen and sent for effectiveness testing. The combination of Ninate 411 and Ethox NP 110 is very effective in emulsifying petroleum solvents. The Sod. Pet. Sulfonates is a good emulsifier, tall oil ester is lipophilic, cocoamide and amine oxides are oil solubilizers, DDBSA TEA soap is good solubilizer/stabilizer.

Information on various oil solubilizing type surfactants and technical support was obtained from the respective manufacturers (e.g. Union Carbide, Stepan, etc.)

The effectiveness test results for the above sample and COREXIT 9500 are as given below:

TABLE IV

| Sample | SLC | PBC |
|---|---|---|
| COREXIT (sample A) | 12.85% | 54.08% |
| Lab sample #12 (sample B) | 11.08% | 20.97% |

Since the test result was not encouraging, surfactant screening was done to pick up the best oil-soluble surfactants and to obtain a stable emulsion.

Screening Test Procedure:

120 ml of the river (sea) water is taken in a 130 ml bottle. Add 100 micro liter($\mu$l) of Prudhoe Bay Crude to the bottle. Add 10 ml of the pure test surfactant. The ratio of the surfactant to oil is 1:10, as per the spec. (the only difference is instead of 100 $\mu$l of the 1:10 mixture, the volume added was 110 $\mu$l) the mix was shaken vigorously 50 times and allowed to stand 10 min. to evaluate the effectiveness of the system and compare it to COREXIT 9500 at the same ratio.

The first set was with pure surfactants, the $2^{nd}$ set was with two surfactants combination with 10 $\mu$l, in a 1:3 ratio and the $3^{rd}$ was with a 3 or more surfactants system with 1:3 ratio but 10 $\mu$l, 20 $\mu$l, or 30 $\mu$l addition. The results are tabulated below:

TABLE V

| SUR-FACTANT | AMOUNT ADDED | NATURE/ HLB VALUE | APPEARANCE STABILITY OF EMULSION | COMMENT SE | USE | LSE |
|---|---|---|---|---|---|---|
| Ethox TO9A | 10 ml | 11.7, P.E.G mono oleate | Very good | X | | |
| Ethox TAM 5 | " | 8.8, P.E. fatty amines | Good | X | | |
| Ethox NP 110 | " | Anionic, Phos. Ester | Poor | | | X |
| Ethox 2449 | " | Cocoamide | Good | X | | |
| Triton H-66 | " | Anionic, Phos. Ester | Poor | | | X |
| Triton 15-S-3 | " | 8.3, P.E. lin. sec. alc 3M | Good | X | | |
| Triton 15-S-5 | " | 10.6, P.E. lin sec. alc. 5M | Similar to TO9A | X | | |
| Petronate HL | " | Na. pet. sulfo., anionic | Good, smaller particles | X | | |
| GMO | " | Glyceryl mono oleate | Not good | | | X |
| Tergitol NP 9 | " | 13, N.P. Ethoxylate, 9M | Boarderline | X | | |
| Tergitol SP-135 | " | 8, amine ethoxylate | Medium | | X | |
| Acintol TEA | " | Tall oil TEA soap | Not good | | | X |
| Ninol 4OCO | " | Cocoamide, | Good | X | | |
| DDBSATEA | " | Sulfonic acid TEA soap | Not good | | | X |
| Triton 15-S-7 | " | 12.4, P.E. lin. alco. 7M | Good, similar to 15-S-5 | X | | |
| Triton X100 | " | 13.5, P.E. octy. Phe. 10 M | Not good | | | X |
| Triton DF 12 | " | 10.6, Non-ionic, PEA, | Good | X | | |
| TMN-3 | " | 8.1, P.E. alcohol, 2.9M | Good | X | | |
| Macol 19 | " | EO/PO block polyol | Not good | | | X |
| ALX 100 | " | Cocoamide, mod. | Good. Fine particles | X | | |
| Ninate 411 | " | DDBSA, IPA anionic | Good. Fine particles | X | | |
| Triton XL 80N | " | Alcohol alkoxylate | Not good | | | X |
| Triton RW 100 | " | 16, ethox. alkyl amine. | Not good | | | X |
| DPM | " | Solvent | Good. fine particles | X | | |
| Amphosol CG | " | Coco betaine, amphot | Good | | X | |
| Triton XJ | " | PE/PP | Good. Fine particles | X | | |

Key for Tables V and VI:
SE: Stable Emulsion
USE : Unstable Emulsion
LSE: Least Stable Emulsion.

$2^{nd}$ Set: Two Components System:

Ethox TO9A is the primary surfactant: others are secondary: the ratio is 3:1 unless otherwise stated. 10 $\mu$l added unless otherwise stated.

TABLE VI

| Surfactants TO9A+ | HLB if any calculated | Appearance | SE | USE | LSE |
|---|---|---|---|---|---|
| Tergitol NP 9 | | Oil separation | | | X |
| Tergitol NP 9, 1:1 | | OK medium | | X | |
| Ninate 411 + NP110 | | Oil separation | | | X |
| Ninate 411 (2) | | Good | X | | |
| Ninate 411, 1:1 (3) | 20 μl | Good | X | | |
| Ethox 2449 | | Good | X | | |
| Triton DF 12 | | Ok medium | | X | |
| Triton DF 12, 1:1 | | Ok (medium) | | X | |
| Ethox NP 110 | | Ok | X | | |
| Burco NPS 225 | | Good * | X | | |
| Ninol 4OCO (2) | | Good | X | | |
| Amphosol CG | | Good * | | X | |
| Petronate HL | | Good * | X | | |

TABLE VI-continued

| Surfactants TO9A+ | HLB if any calculated | Appearance | SE | USE | LSE |
|---|---|---|---|---|---|
| Petronate HL 1:1. | | Good * | X | | |
| Triton XJ | | Good | X | | |
| DDBSA | | Good * | X | | |
| Triton 15-S-5 | | Good | X | | |
| Ethox Tam-5 | | Good | X | | |
| DDBSA/TEA/ DPM | | Good * | X | | |

(2) set of two, 1:1 is the ratio.
* produced stable emulsion.

The order of preference of surfactants is as follows: 3:1 RATIO

TO9A>4OCO>XJ>DF12>TAM 5>15-S-5>NP110>NINATE 411.

3rd Set: 4–5 Component System:

In this section, Ethox TO9A was used as the primary surfactant while other surfactant blends were test at a ratio 3:1 and modification thereof. A combination of the above selected surfactants was conceived and formulations with the following variations were evaluated:

TABLE VII

| System | 1 | 1a | 1b | 1c | 2 | 2a | 3 | 3a | 3b | 4 | 4a | 5 | 5a | 5b | 6 | 6a | 6b |
|---|---|---|---|---|---|---|---|---|---|---|---|---|---|---|---|---|---|
| TO9A | 30 | 30 | 30 | 30 | 30 | 30 | 30 | 30 | 30 | 30 | 30 | 30 | 30 | 30 | 30 | 30 | 30 |
| TRIT.XJ | 5 | 30 | 10 | 10 | 5 | 5 | — | — | — | 10 | 10 | — | — | — | 5 | 5 | 5 |
| TAMS | 5 | 10 | 5 | 5 | 5 | 5 | — | — | — | — | — | 10 | 10 | 10 | 5 | 5 | 15 |
| 15-S-5 | 5 | 5 | 5 | 5 | — | — | 10 | 10 | 10 | — | — | — | — | — | 3 | 3 | 3 |
| DF-12 | — | 5 | 5 | 5 | — | — | — | — | — | — | — | — | — | — | 3 | 3 | 3 |
| 4OCO | — | — | — | — | 5 | 5 | 5 | 5 | 5 | 5 | 5 | 5 | 5 | 5 | 3 | 3 | 3 |
| NP110 | — | — | — | — | — | — | — | — | — | — | — | — | — | — | 1 | 1 | 1 |
| NIN.411 | — | — | — | — | — | — | — | — | — | — | — | — | — | — | 1 | 1 | 1 |
| DPM | — | — | — | — | 5 | — | 5 | — | 5 | 10 | — | 5 | — | 5 | 10 | — | 10 | 20 |
| NA.P.S | — | — | — | — | — | — | — | — | — | — | — | — | — | — | — | — | — |
| H2O | — | — | — | — | — | — | — | — | — | — | — | — | — | — | — | — | — |

Comments:

System 1 is good; 1c is better than 1b or 1a; and 1c>1b>1a>1 in results. System 2 is good as is 2a. System 3 has faster dissolution than 5 or 2. System 3a is ok; 3b is ok; and 3>3a>3b in results. System 4 and 4a are not good, 5 is not good; 5a is better than 5b. System 6 and 6a are not good 6b was ok. COREXIT behaves similar to 3.

Another set of formulations was made based on the performance listed above.

TABLE VIII

| System | 3 | 4 | 5 | 5A | 7 | 7A | 7B | 7C | 7D | 7E | 7F | 9 % | 10 % | 11 % | E1 % | E2 % | E3 % |
|---|---|---|---|---|---|---|---|---|---|---|---|---|---|---|---|---|---|
| TO9A | 30 | 30 | 30 | 30 | 40 | 40 | 40 | 40 | 40 | 40 | 40 | 30 | 40 | 40 | 30 | 36.0 | 30 |
| TRIT. XJ | — | 10 | — | — | — | — | — | 5 | — | — | — | — | 5 | — | 5 | — | 5 |
| TAM5 | — | — | 10 | 10 | 15 | 15 | 15 | 15 | 15 | 15 | 15 | 10 | 15 | 15 | 5 | 12.8 | 15 |

TABLE VIII-continued

| System | 3 | 4 | 5 | 5A | 7 | 7A | 7B | 7C | 7D | 7E | 7F | 9 % | 10 % | 11 % | E1 % | E2 % | E3 % |
|---|---|---|---|---|---|---|---|---|---|---|---|---|---|---|---|---|---|
| 15-S-5 | 10 | — | — | — | 5 | 10 | 5 | 5 | 5 | 5 | 5 | 5 | 5 | 5 | 3 | 4.5 | 3 |
| DF-12  | — | — | — | — | — | — | — | — | 5 | — | — | — | 5 | 10 | 3 | —   | 3 |
| 4OCO   | 5 | 5 | 5 | 5 | 10 | 10 | 10 | 10 | 10 | 10 | 10 | 8 | 10 | 10 | 3 | 8.9 | 3 |
| NP110  | — | — | — | — | — | — | — | — | — | — | — | — | — | — | 1 | —   | 1 |
| NIN.411| — | — | — | — | — | — | — | — | — | — | — | — | — | — | 1 | —   | 1 |
| DPM    | — | — | — | 5 | 10 | 10 | 15 | 10 | 10 | 10 | 10 | 15 | 15 | 10 | — | 8.9 | 20 |
| NA.P.S | — | — | — | — | — | — | — | — | — | — | 10 | 10 | 10 | 10 | — | 8.9 | — |
| H2O    | — | — | — | — | — | — | — | — | — | 10 | — | 22 | — | — | — | 20.0 | — |

Composition 7 does not add up to 100% however, the % could be calculated from the weights.

Composition 7F appeared to be the best. E1=85% of 7F; E2=80% of 7F; and E3=90% of 7F. 7F is the concentrate.

The performance of the formulations are as follows:

7F>7D>7C>7B>7>11>7C.

TABLE IX

| PRODUCT | SLC | PBC | COMMENT |
|---|---|---|---|
| COREXIT 9500 | GOOD | BETTER | CONTROL |
| 7F | BETTER THAN CONTROL | GOOD | BETTER |
| 80% 7F | GOOD (7F > 7D > 85 > 80 > 90) | GOOD | GOOD |
| 85% 7F | GOOD | GOOD | GOOD |
| 90% 7F | GOOD | GOOD | GOOD |
| 7D | GOOD (7F > 7D > 7B > 7 > 80%) | GOOD | GOOD |
| 7 | GOOD | GOOD | GOOD |
| 7A | G | G | G |
| 7B, C, D F, G | GOOD | GOOD | GOOD |
| 9, 10, 11 | GOOD | GOOD | GOOD |

Sample of 7F, 80% 7F and 85% 7F were resubmitted for effectiveness test and compared against COREXIT 9500. Various combinations of these surfactants could be evaluated to optimize the performance. Selected, not necessarily the best, surfactants from the screening tests were included in this formulations. Other combinations according to the invention may meet any desired property or even excel the present properties of the preferred embodiments. Some of the surfactants that may form even better dispersants than the preferred embodiment are in the previous table for future evaluation.

The actual composition of the 3 preferred dispersants of the invention and those submitted for testing are given below:

TABLE X

| Ingredients | 7F | E1 = 85% 7F | E2 = 80% 7F |
|---|---|---|---|
| Ethox TO9A | 45.1 | 38.4 | 36.0 |
| Ethox TAM-5 | 16.1 | 13.7 | 12.8 |
| Ninol 4OCO | 11.1 | 9.4 | 8.9 |
| Tergitol 15-S-5 | 05.5 | 4.7 | 4.5 |
| Petronate HL, Sod. Pet. sulfonate | 11.1 | 9.4 | 8.9 |
| Di propylene glycol mono methyl ether | 11.1 | 9.4 | 8.9 |
| Water | — | 15.0 | 20.0 |

The results are summarized in the following Table.

TABLE XI

| | EFFECTIVENESS, % | | |
|---|---|---|---|
| OIL | 7F (conc) | E2 | E1 |
| South Louisiana Crude | 109 | 88 | 105 |
| Prudhoe Bay Crude | 27.1 | 24.7 | 34.4 |
| South Louisiana and Prudhoe Bay Crudes, Average | 63 | 56 | 67 |

The initial screening test gave values as given above. The initial screening test is a less comprehensive test than the final confirmatory test and is used to eliminate samples which would clearly not satisfy the criteria of the confirmatory test. The final confirmatory test gave the following result for the submitted sample E2=80% of 7F (concentrate). Samples concentrate, E1 and E2 all had an average effectiveness of more than 65%.

TABLE XII

| OIL | EFFECTIVENESS, % |
|---|---|
| South Louisiana Crude | 105 |
| Prudhoe Bay Crude | 40 |
| South Louisiana and Prudhoe Bay Crudes, Average | 73 |

Testing and these results were conducted by Battelle Labs. Dispersant toxicity testing was performed by Coastal Bioanalysts.

TABLE XIII

| PRODUCT TESTED | SPECIES | RESULT: $LC_{50}$ (ppm) |
|---|---|---|
| OIL ONLY: | Acute *Menidia Bahia* | 48 HOUR 11.7 |
| NO.2 FUEL OIL | Acute *Menidia Berylilina* | 96 HOUR 11.6 |
| DISPERSIT SPC 1000 ONLY | Acute *Menidia Bahia* | 48 HOUR 16.6 |
| | Acute *Menidia Berylilina* | 96 HOUR 3.5 |
| OIL AND DISPERSIT SPC 1000 (10:1 V:V) | Acute *Menidia Bahia* | 48 HOUR 8.2 |
| | Acute *Menidia Berylilina* | 96 HOUR 7.9 |

This toxicity data was obtained using the concentrated product.

Comparison:

A comparison of effectiveness and toxicity of the invention and various similar products available internationally was also made.

TABLE XIV

| PRODUCT/ | EFFECTIVENESS % | | | TOXICITY, LC 50 (PPM) | | | | | |
|---|---|---|---|---|---|---|---|---|---|
| | | | | OIL ONLY | | DISPERSANT ONLY | | OIL + DISPERSANT | |
| DISPERSANT | SLC | PBC | AVERAGE | M.BAHIA | M.BERYLLINA | M.BAHIA | M.BERYLLINA | M.BAHIA | M.BERYLLINA |
| POLYCHEM SPC1000 | 40.0 | 105 | 73 | 11.7 | 11.6 | 16.6 | 3.5 | 8.2 | 7.9 |
| COREXIT 9500 | 54.7 | 45.3 | 50.0 | 16.12 | 10.72 | 32.23 | 25.20 | 3.4 | 2.61 |
| COREXIT 9527 | 63.4 | 37.4 | 50.4 | 16.12 | 10.72 | 24.14 | 14.57 | 6.6 | 4.49 |
| MARE CLEAN 200 | 84.14 | 63.97 | 74.06 | 16.12 | 10.72 | 938 | 1996 | 9.82 | 7.07 |
| NEOS AB 3000 | 89.8 | 19.7 | 54.8 | 11.5 | 201.8 | 33 | 91.1 | 9.3 | 1.5 |

The Control Toxicant (Dss): M.bahia 9.82
M.beryllina 7.07
*Mysidopsis bahia* LC50 (ppm) 48 Hours
*Menidia beryllina* LC50 (ppm) 96 hours.

Method of Use:
The recommended application procedure is as follows:
Concentration/Application rate:
A dispersant to oil ratio of 1 part dispersant to 50 parts oil to 1:10 or an application rate of about 2–10 gallons (7.6 liters–37.9 liters) per acre (4840 square meter) is suggested. This rate will be dependent on the type of oil, degree of weathering, temperature and extent of the oil spill or slick.

Conditions for Use:
Timely application ensures the highest degree of successful dispersion of the oil spill.

Application Method:
The dispersant may be applied by any conventional methods such as (1) aerial spraying or (2) boat spraying to accommodate weather conditions.

Lack of Other Contaminants:
The dispersant of the present invention is also free of all heavy metals, cyanide and chlorinated hydrocarbon. These and other harmful ingredients are not found in the commercial product made according to the preferred embodiment of the invention:

| Contaminant | Concentration |
|---|---|
| Arsenic | Not Present |
| Cadmium | Not Present |
| Chromium | Not Present |
| Copper | Not Present |
| Lead | Not Present |
| Mercury | Not Present |
| Nickel | Not Present |
| Zinc | Not Present |
| Cyanide | Not Present |
| Chlorinated Hydrocarbons | Not Present |

The laboratories that performed the required tests to verify compliance with EPA regulations for a dispersant are:
Effectiveness:
Battelle Labs
397 Washington Street
Duxbury, Mass. 02332
Toxicity:
Coastal Bioanalysts, Inc
6400 Enterprise Court
Gloucester, Va. 23061.

While a specific embodiment of the invention has been shown and described in detail to illustrate the application of the principles of the invention, it will be understood that the invention may be embodied otherwise without departing from such principles.

What is claimed is:

1. A method for dispersing a petrochemical spill on a body of water, comprising:
providing a dispersant which contains about 35 to about 85 percent by weight of an oil-soluble surfactant combination of a type and in a quantity to form a mixture with petrochemical for the spill, the oil-soluble surfactant combination comprising a plurality of oil-soluble surfactants which are each non-ionic and have a different hydrophilic and lipophilic balance, the oil-soluble surfactant combination including poly ethylene glycol mono-oleate, about 8 to about 32 percent by weight of at least one water-soluble surfactant of a type and in a quantity to emulsify the mixture with water from the body of water, said at least one water-soluble surfactant comprising cocoamide, about 4 to about 16 percent by weight of a co-solvent for coupling the mixture with the water-soluble surfactant to help emulsify the petrochemical into the body of water, and about zero to about 50 percent by weight water; and supplying an effective amount of the dispersant onto the body of water at the spill, for dispersing the spill by emulsifying at least some of the petrochemical into the body of water.

2. A method according to claim 1, including supplying the dispersant to the petrochemical spill in an amount of about one part by weight dispersant to about 5 to 100 parts by weight petrochemical.

3. A method according to claim 1, wherein the oil-soluble surfactant combination includes at least one surfactant have a hydrophilic and lipophilic balance averaging about 10 to about 18.

4. A method according to claim 1, including a sufficient amount of said water in the dispersant to result in a viscosity for the dispersant in the range of about 75 to about 200 cP.

5. A method according to claim 1, wherein the water-soluble surfactant further comprises at least one surfactant that is anionic in addition to said cocoamide.

6. A method according to claim 1, wherein the co-solvent is soluble in the petrochemical, in water and in the surfactants of the dispersant.

7. A dispersant for dispersing a petrochemical spill on a body of water, the dispersant comprising:
about 35 to about 85 percent by weight of an oil-soluble surfactant combination of a type and in a quantity to form a mixture with petrochemical from the spill, the oil-soluble surfactant combination comprising a plurality of oil-soluble surfactants which are each non-ionic and have a different hydrophilic and lipophilic balance, the oil-soluble surfactant combination including poly ethylene glycol mono-oleate;
about 8 to about 32 percent by weight of at least one water-soluble surfactant of a type and in a quantity to emulsify the mixture with water from the body of water, said at least one water-soluble surfactant comprising cocoamide;

about 4 to about 16 percent by weight of a non-petroleum co-solvent for coupling the mixture with the water-soluble surfactant to help emulsify the petrochemical into the body of water; and about zero to about 50 percent by weight water.

8. A dispersant according to claim 7, including a sufficient amount of said water in the dispersant to result in a viscosity for the dispersant in the range of about 75 to about 200 cP.

9. A dispersant according to claim 8, wherein the oil-soluble surfactant combination has a hydrophilic and lipophilic balance averaging about 10 to about 18.

10. A dispersant according to claim 9, wherein the water-soluble surfactant further comprises a surfactant that is anionic in addition to said cocoamide.

11. A dispersant according to claim 7, wherein the co-solvent is soluble in the petrochemical, in water and in the surfactants of the dispersant.

12. A dispersant according to claim 7, wherein the ratio of poly ethylene glycol mono-oleate to all other surfactants in the dispersant is about 5:1 to 1:5.

13. A dispersant according to claim 7, wherein the oil-soluble surfactant combination includes poly oxyethylene tallow amine.

14. A dispersant according to claim 13 wherein the oil-soluble surfactant combination includes poly ethoxylated, linear secondary alcohol.

15. A dispersant for dispersing a petrochemical spill on a body of water, the dispersant comprising:

an oil-soluble surfactant combination comprising a plurality of oil-soluble surfactants which are each nonionic and have a different hydrophilic and lipophilic balance, the oil-soluble surfactant combination comprising a poly ethoxylated surfactant and poly ethylene glycol mono-oleate, the oil-soluble surfactant combination being of a type and in a quantity to form a mixture with petrochemical from the spill;

a water-soluble surfactant combination comprising an anionic surfactant and cocoamide, and being of a type and in a quantity to emulsify the mixture with water from the body of water;

a ratio of poly ethylene glycol mono-oleate to all other surfactants in the dispersant being about 5:1 to 1:5; and a non-petroleum co-solvent for coupling the mixture with the water-soluble surfactant combination to help emulsify the petrochemical into the body of water.

* * * * *